Figure 1:
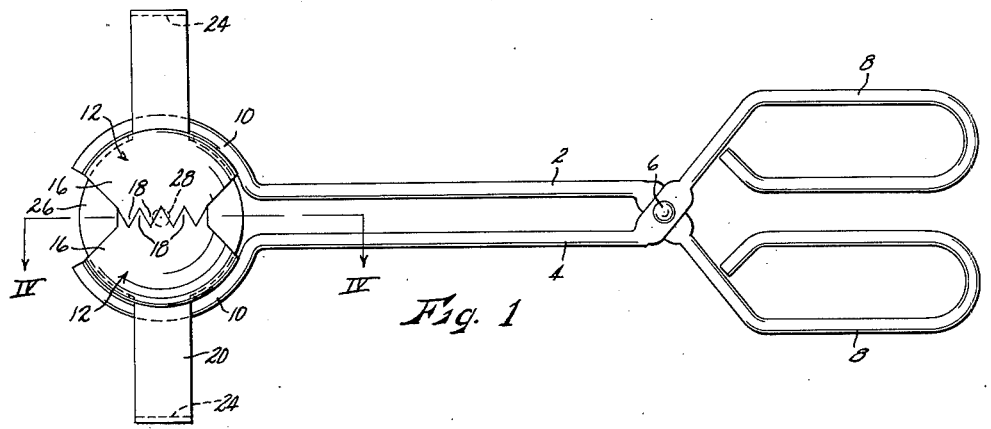

May 29, 1962  D. L. GOODLOE  3,036,610

DEVICE FOR OPENING EGGS

Filed March 25, 1959

INVENTOR.
Durrill L. Goodloe
BY John A. Hamilton
Attorney.

United States Patent Office 3,036,610
Patented May 29, 1962

3,036,610
DEVICE FOR OPENING EGGS
Durrill L. Goodloe, 607 Browning, Lee's Summit, Mo.
Filed Mar. 25, 1959, Ser. No. 801,762
4 Claims. (Cl. 146—2)

This invention relates to new and useful improvements in devices for opening eggs, and has particular reference to a device for removing one end portion of the shell of an egg, as is customary preparatory to eating a soft-boiled egg, the egg contents then ordinarily being spooned from the shell through the opening provided by the removal of the end portion of the shell, while the egg is supported in an egg cup or the like.

The principal object of the present invention is the provision of a device which will open an egg in the manner described in a very effective and efficient manner, without necessity of touching or handling the egg manually at any time. To this end, my device includes a pair of cooperating toothed jaws carried by relatively pivoted handles, whereby manipulation of said handles will operate said jaws to cut or pinch away a portion of the egg shell therebetween.

Another object is the provision of a device of the character described which will produce a generally concave cut across the egg, whereby the contents of the egg, if unusually soft or liquid, will not be spilled.

A further object is the provision, in a device of the character described, of stop means which gauges and positions the jaws accurately with respect to the egg, so as to determine and limit how much of the shell will be cut away by the jaws.

A still further object is the provision, in a device of the character described, of a spike or pin which penetrates the shell of the egg prior to the operation of the jaws. This spike serves the double function of maintaining the jaws centered relative to the egg, and also of weakening the shell so that the jaws will penetrate it easily rather than tending to slip or slide on the hard convex surface thereof.

Other objects are simplicity and economy of construction, efficiency and dependability of operation, and adaptability for uses other than the opening of eggs.

Figure 2:
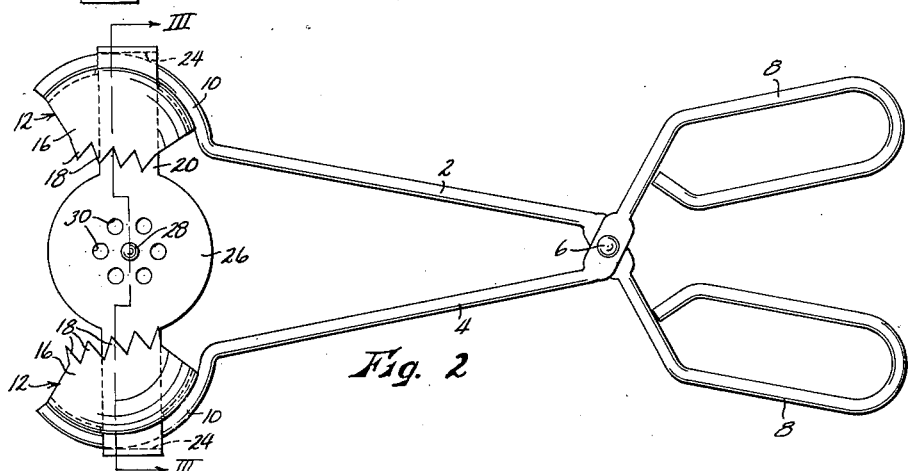
Figures 3, 4:
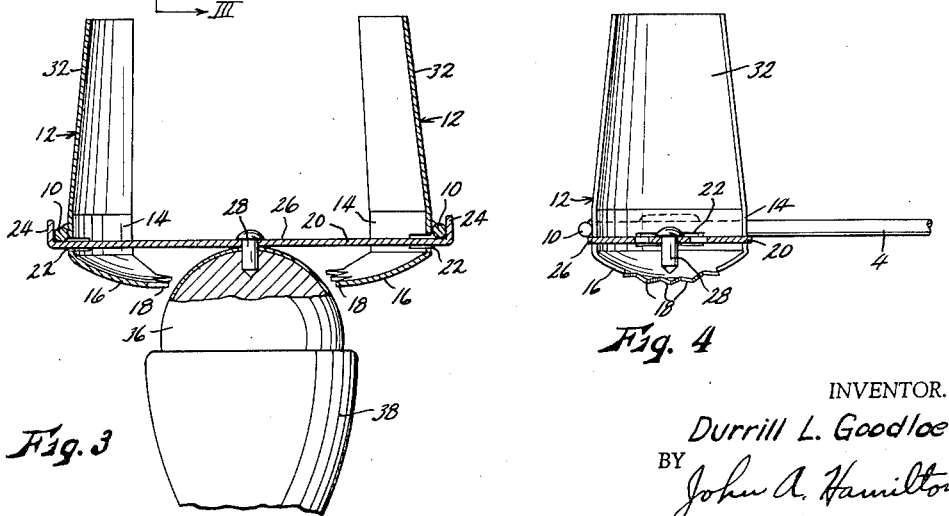

With these objects in view, as well as other objects which will appear in the course of the specification, reference will be had to the drawing, wherein:

FIG. 1 is an inverted plan view of a device for opening eggs which embodies the present invention, with the jaws closed, FIG. 2 is a view similar to FIG. 1, but with the jaws open, FIG. 3 is a sectional view taken on line III—III of FIG. 2, showing the device in operative relationship to an egg supported in an egg cup, and FIG. 4 is a sectional view taken on line IV—IV of FIG. 1.

Like reference numerals apply to similar parts throughout the several views, and the numerals 2 and 4 apply respectively to a pair of elongated levers or handles which intersect intermediate their ends and are pivoted together at their intersection as at 6. One end of each handle is formed to present a loop 8, into which loops the user may insert his fingers to hold the tool and move the handles pivotally with respect to each other. The opposite end of each handle is formed in an arcuate bend as indicated at 10, each of which serves as a mounting and support for one of the jaws to be described below. When the handles 2 and 4 are approximately parallel to each other as shown in FIG. 1, the bends 10 define a generally circular loop lying in the plane of pivotal movement of the handles.

Each of the handle portions 10 has a jaw member carried thereby and designated generally by the numeral 12. Each of said jaw members is formed preferably of sheet metal, and includes a central portion 14 which is cylindrically curved with its axis of curvature coinciding with the center of curvature of handle portion 10, and is welded or otherwise permanently affixed to said handle portion. At its lower edge, central portion 14 is provided with an inward extension 16 which constitutes the actual jaw, the inner edge of said jaw being toothed as indicated at 18. Said jaws are adapted to be moved between a closed position, in which the teeth thereof intermesh as shown in FIG. 1, and an open position as shown in FIGS. 2 and 3 in which the jaws are widely separated, by manipulation of the handles 2 and 4. The jaws 16 are downwardly convex, so that when closed they define a section of the surface of a sphere, for a purpose which will presently appear.

A planar bar 20 disposed substantially in the plane of handle portions 10 extends between jaw members 12, and extends slidably through a slot 22 formed therefor in central portion 14 of each of said jaw members. The outer end portions of said bar are turned upwardly to form stops 24 which engage handle portions 10 as shown in FIGS. 2 and 3 to limit the opening movement of the jaws. Midway between its ends, bar 20 is provided with a circular enlargement 26 of such diameter that when the jaws are closed, it will engage the inner surfaces of the central portions 14 of the jaw members, also for a purpose which will presently be described. Affixed centrally in said enlargement is a downwardly extending spike or pin 28, the lower end of which is sharpened as shown. Said spike has less downward projection from bar 20 than do jaws 16, in order that it will not interfere with the closing of said jaws. A ring of perforations 30 are formed through bar enlargement 26 around spike 28. Each jaw member 12 is also extended upwardly from the central section 14 thereof, the upward extension 32 constituting a finger which is curved conically about the same axis as central cylindrical portion 14. The two fingers 32 are of course disposed in opposed relation, so that an egg may be held therebetween.

In use, the two extension fingers 32 may be used to lift an egg 36 from the water in which it has been boiled, being gripped therebetween by urging finger loops 8 toward each other, and deposit it in an egg cup shown fragmentarily at 38. In this manner, there is no necessity that the hot egg or water be touched by the hands. The device is then turned over so that spike 28 projects downwardly, and the jaws are moved apart to their widest separation by moving finger loops 8 apart. The stops 24 of bar 20 engage handle portions 10 to limit the separation of the jaws, and also provide that spike 28 will be centered between the jaws as shown in FIGS. 2 and 3. The spike is then brought down sharply on the upper end of the egg, so that the sharpened end of the spike penetrates the shell as shown in FIG. 3. The perforations 30 in the central enlargement 26 of bar 20 provide good visibility around the spike, in order that said spike may be directed accurately at the desired point of the egg shell.

The bar 20 limits the penetration of the spike into the egg, also as shown in FIG. 3, and hence limits the downward movement of the jaws 16 with respect to the egg, so that when the jaws are next brought together by moving finger loops 8 toward each other, said jaws will cut off only a predetermined and limited portion of said egg. Spike 28 also has important functions with respect to the cutting or breaking action of the jaws 16 and teeth 18. Firstly, it is of course apparent that the teeth 18 of the two jaws engage opposite sides of a convex portion of the egg shell, and there is therefore a strong tendency for said teeth to slide upwardly over the shell without penetrating it. An unbroken egg shell is very hard and smooth, and of rather surprising strength. However, the penetration of the shell by the spike, and the cracks in the shell which radiate from the point of penetration, so weakens the shell that it yields easily to the jaw teeth 18. Slippage of the jaw teeth on the shell may be still further prevented since the bar 20 may be manually pressed down firmly against the egg, thereby resisting any tendency of the teeth to slide on the egg shell. Secondly, the spike, being positioned in the egg and thereby being somewhat anchored against lateral movement, tends to insure that the two jaws 16 will penetrate the egg equally and will meet at the vertical center of the egg. That is, if one jaw enters the egg sufficiently so that the teeth 18 thereof are disposed directly beneath spike 28, as in FIG. 1, then the central portion 14 of that jaw will contact and be arrested by the central circular enlargement 26 of bar 20. Then so long as the spike remains at least partially restrained by its engagement in the egg, that jaw will not move any further relative to the egg, and the second jaw must move inwardly to meet the first.

The portion of the egg shell and contents cut off by the jaws 16 will of course be lifted away with the jaws, and may be disposed of as desired. Due to the spherical curvature of blades 16, as previously described, they will make an upwardly concave cut across the egg, if a slight downward pressure of the device against the egg is maintained as the jaws are brought together so that the teeth thereof will move slightly downwardly after they have penetrated the shell. In this manner, enough of the egg contents are removed with the device that there will be no spillage of said contents after the egg is opened, even though said contents may be quite fluid.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A device for opening eggs comprising a pair of opposed jaws and means interconnecting said jaws for relative movement toward and from each other in a horizontal plane, said jaws extending inwardly and downwardly toward each other from their points of attachment to said interconnecting means, the mating edges of said jaws also having a downwardly convex curvature in a vertical plane at right angles to the direction of relative movement of said jaws.

2. A device for opening eggs comprising a pair of opposed jaws and means interconnecting said jaws for relative movement toward and from each other in a horizontal plane, said jaws being formed of sheet metal and having intermeshing teeth formed in the mating edges thereof, said jaws when engaged forming a downwardly convex portion of a sphere secured at its upper edges to said interconnecting means and with the mating edges of said jaws bisecting said spherical portion.

3. A device for opening eggs comprising a pair of opposed jaws, means interconnecting said jaws for relative movement toward and from each other in a horizontal plane, said jaws extending inwardly and downwardly toward each other from said interconnecting means and having mating edges, a generally horizontal planar bar disposed at a predetermined vertical distance above the mating edges of said jaws whereby to limit the insertion of an egg between said jaws, said bar extending between said jaws and being slidably mounted in each of said jaws for movement relative thereto in the direction of relative movement of said jaws, and a spike affixed centrally to said bar so as to extend downwardly intermediate said jaws, the lower end of said spike being sharpened and being disposed above the horizontal plane of the mating edges of said jaws, said bar being provided with a central enlargement operable to be engaged by both of said jaws when said jaws are closed, whereby said spike is centered above the mating edges of said jaws when said jaws are closed.

4. A device for opening eggs comprising a pair of opposed jaws, means interconnecting said jaws for relative movement toward and from each other in a horizontal plane, said jaws extending inwardly and downwardly toward each other from said interconnecting means and having mating edges, a generally horizontal planar bar disposed at a predetermined vertical distance above the mating edges of said jaws whereby to limit the insertion of an egg between said jaws, said bar extending between said jaws and being slidably mounted in each of said jaws for movement relative thereto in the direction of relative movement of said jaws, and a spike affixed centrally to said bar so as to extend downwardly intermediate said jaws, the lower end of said spike being sharpened and being disposed above the horizontal plane of the mating edges of said jaws, said bar being provided with a central enlargement operable to be engaged by both of said jaws when said jaws are closed, whereby said spike is centered above the mating edges of said jaws when said jaws are closed, said bar also being provided with a stop member affixed to each end thereof and operable to limit the separation of said jaws, whereby said spike is centered between said jaws when said jaws are fully opened.

References Cited in the file of this patent

UNITED STATES PATENTS

| | | |
|---|---|---|
| 1,372,111 | Van Melsen | Mar. 22, 1921 |
| 1,491,908 | Greig | Apr. 29, 1924 |
| 2,729,254 | McLaughlin | Jan. 3, 1956 |